(12) United States Patent
Oren et al.

(10) Patent No.: US 6,240,401 B1
(45) Date of Patent: May 29, 2001

(54) SYSTEM AND METHOD FOR MOVIE TRANSACTION PROCESSING

(75) Inventors: Joseph Eugene Oren, Glen Allen; Robert W. Schumann, Oakton; Lisa S. Walko, Glen Allen; Kevin S. McQueen, Richmond, all of VA (US)

(73) Assignee: Digital Video Express, L.P., Herndon, VA (US)

( * ) Notice: Subject to any disclaimer, the term of this patent is extended or adjusted under 35 U.S.C. 154(b) by 0 days.

(21) Appl. No.: 09/092,177

(22) Filed: Jun. 5, 1998

(51) Int. Cl.[7] .................................................. G06F 17/60
(52) U.S. Cl. .............................. 705/40; 705/32; 705/34; 725/1; 725/2; 725/4; 725/5
(58) Field of Search .................... 705/44, 5, 26, 705/30, 32, 34, 1, 42, 400, 51, 52, 53, 54, 57, 59; 348/1, 10, 3, 7; 345/327; 725/1, 2, 4, 5

(56) References Cited

U.S. PATENT DOCUMENTS 4,361,851 * 11/1982 Asip et al. ................................. 348/3
4,710,955 * 12/1987 Kauffman ................................. 348/3

(List continued on next page.)

FOREIGN PATENT DOCUMENTS

| 0766475 A1 | * | 4/1997 | (EP) | ............................. H04N/7/173 |
| 0808048 A2 | * | 11/1997 | (EP) | ............................. H04L/29/06 |
| WO 97/25785 | * | 7/1997 | (WO) | ............................. H04B/7/155 |

OTHER PUBLICATIONS

Pargh, Andy, "Digital Disc Offers Bargain, With Strings", Design News, vol. 52, Issue 21, p. 152, Nov. 3, 1997.*
Desmond, Edward, "Set–Top Boxing", Fortune, vol. 136, Issue 9, pp. 91–94, Nov. 10, 1997.*
Erickson, Jim, "Technology: Here Comes Dial–a–Movie: Asian Pioneers in the Digital Dream Market", AsiaWeek, Hong Kong, p. 1, Dec. 1, 1997.*
No Author, "How to Beat Web Piracy—and Make Serious Money", Publishing Technology review, vol. 3, No. 6, Jun. 1, 1996.*

Primary Examiner—James P. Trammell
Assistant Examiner—John W. Hayes
(74) Attorney, Agent, or Firm—McDermott, Will & Emery; Paul Derinsky

(57) ABSTRACT

A system and method for tracking and processing transactions for such purposes as creating billing record and detecting possible fraudulent activities. The system and method relates to processing transactions associated with viewing movies, e.g. a video content distributed digitally on a digital video disc (DVD) in an scrambled format, where the video content is only viewable in conjunction with the use of a specially designed and enabled player. This method of distributing and billing movie content provides an alternative to current methods such as viewing via video tapes, open format DVDs, pay-per-view, or cable service. The system and method permits a user to establish, via a single authorization, multiple access to a service during a period of time, where each event of access is not individually billed. The system and method does not create a billable charge for a user authorization if the user does not actually access the service. Furthermore, the system and method requires a user to initiate a new authorization after the original authorization has expired, in order to re-access the service. Additionally, the system and method provides one or a plurality of devices local to the user, electronically linked to a remote host, in order to create, store and transmit records of authorization and access to a remote central processor in a secure manner.

30 Claims, 4 Drawing Sheets

U.S. PATENT DOCUMENTS

| | | | |
|---|---|---|---|
| 4,712,238 | * 12/1987 | Gilhousen et al. | 348/3 |
| 4,893,248 | * 1/1990 | Pitts et al. | 705/400 |
| 5,357,276 | * 10/1994 | Banker et al. | 348/7 |
| 5,539,822 | * 7/1996 | Lett | 348/3 |
| 5,619,247 | * 4/1997 | Russo | 348/3 |
| 5,629,980 | * 5/1997 | Stefik et al. | 705/54 |
| 5,654,747 | * 8/1997 | Ottesen et al. | 348/10 |
| 5,661,517 | * 8/1997 | Budow et al. | 348/1 |
| 5,682,482 | * 10/1997 | Burt et al. | 705/42 |
| 5,701,152 | * 12/1997 | Chen | 348/3 |
| 5,703,951 | * 12/1997 | Dolphin | 705/51 |
| 5,715,403 | * 2/1998 | Stefik | 705/54 |
| 5,727,065 | * 3/1998 | Dillon | 705/52 |
| 5,742,677 | * 4/1998 | Pinder et al. | 380/4 |
| 5,745,710 | * 4/1998 | Clanton, III et al. | 348/7 |
| 5,778,182 | * 7/1998 | Cathey et al. | 348/1 |
| 5,838,314 | * 11/1998 | Neel et al. | 348/7 |
| 5,857,020 | * 1/1999 | Peterson, Jr. | 705/52 |
| 5,861,906 | * 1/1999 | Dunn et al. | 348/7 |
| 5,899,983 | * 5/1999 | Hussmann | 705/44 |
| 5,949,875 | * 9/1999 | Walker et al. | 705/53 |
| 5,960,416 | * 9/1999 | Block | 705/34 |
| 6,002,694 | * 12/1999 | Yoshizawa et al. | 348/3 |
| 6,046,760 | * 4/2000 | Jun | 348/7 |
| 6,072,982 | * 6/2000 | Haddad | 348/7 |
| 6,091,823 | * 7/2000 | Hosomi et al. | 348/3 |
| 6,112,181 | * 8/2000 | Shear et al. | 705/1 |

* cited by examiner

SYSTEM AND METHOD FOR MOVIE TRANSACTION PROCESSING

FIELD OF THE INVENTION

The present invention generally relates to a system and method for processing transactions. More particularly, the invention relates to a system and method for tracking a transaction history for such purposes as creating a billing record and detecting possible fraudulent activities. Even more particularly, the present invention relates to a system and method for processing transactions associated with viewing movies, e.g. video content distributed digitally on a digital video disc (DVD) in an scrambled format, where the video content is only viewable in conjunction with the use of a specially designed and enabled player. This method of distributing and billing movie content provides an alternative to current methods such as viewing via video tapes, open format DVDs, pay-per-view, or cable service.

BACKGROUND OF THE INVENTION

For the purposes of tracking transactions and determining billing, there are two conventional types of on-line services, each relying on an associated protocol or algorithm. In one type of service, a service provider such as an Internet service provider (ISP), charges a user a fee for the right to use the service for a limited period of time. The user may log onto the service as many times as she would like within a specified time period (e.g. one month), without being charged for each individual access. However, the ISP user is charged whether or not the service is used. In a variation of that system, a user may be charged for each access as a separate billing event.

There are also conventional tracking systems for tracking reserved access, such as, for example, a hotel room or a rental car. A customer may make a reservation with the service provider. If the customer makes but does not show up for a reservation, and has not guaranteed the reservation with pre-payment, the hotel or car rental company simply drops the reservation and the customer is not charged. Such systems typically allow the customer to reserve and to later access the room or car for specific dates, and also permits the customer to extend the time period of that access, without making another reservation. In a variation of that system, where the customer guarantees the reservation, the customer is charged for the reserved access, regardless of whether the room or car is actually used.

While such systems are adequate for tracking and billing certain types of services, there exists a need for an alternative system and method for tracking transactions and determining charges which permits a user to establish, via a single authorization, multiple access to a service during a period of time, where each event of access is not individually billed. There exists a need for a system and method which does not create a billable charge for a user authorization if the user does not actually access the service. Furthermore, there is a need for a system and method, which requires a user to initiate a new authorization after the original authorization has expired, in order to create a chain of authorization and access events. Additionally, there exists a need for a system and method that provides a plurality of devices local to the user, in order to create, store and transmit records of authorization and access to a remote central processor in a secure manner.

The following terms as used herein have the associated meanings as described below.

An authorization transaction is a record generated when a user authorizes a charge for an access right.

An access transaction is a record generated when the user exercises the right of access granted by the authorization transaction.

A matching transaction is an event that occurs when an access transaction matches an authorization transaction, which is only when they are from the same customer, for the same service, and the starting time for the access falls within the duration of the authorization. A user is charged when a matching transaction occurs.

A validated authorization is an authorization transaction with at least one matching access transaction.

A Billable Content Unit (BCU) provides access to the service, e.g., a BCU may be in the form of a digital video disc.

A Set Top Box (STB) is a device that has the capability to play a video content and to also keep a journal of billable and nonbillable activities and to transmit the journal to a central database host and transaction processor.

A journal is a log of the activities of a particular STB. It contains digital tickets (as defined below) and play records (as defined below).

A digital ticket ("ticket") is a journal entry recording a user authorization, i.e. a user agreeing to be billed for the access rights to a BCU for a stated time interval. Every digital ticket contains a unique serial number, a start time, a duration, the account number of the STB that created it, and the serial number of the accessed BCU. A digital ticket represents an authorization transaction.

A play is a journal entry recording that the user accessed a BCU during the duration of a digital ticket. A play contains a start time, a duration, the serial number of the digital ticket that allowed the play, the account number of the STB that created it, and the serial number of the accessed BCU. A play represents an access transaction.

SUMMARY

It is an object of this invention to provide a system and method for tracking transactions and determining charges.

It is another object of this invention to provide a system and method wherein a user of a service can obtain multiple access to a service over a prescribed time interval, by establishing a single authorization.

It is yet a further object of the invention to provide a system and method wherein multiple access transactions can be charged as a single billable event.

It is still a further object of the invention to provide a system and method wherein a service user is charged only if the service authorized is actually accessed or used.

It is yet a further object of the invention to provide a system and method where a customer may access a service at any time, subject only to a prior authorization to be charged for that access.

It is still a further object of the invention to provide a system and method where a plurality of devices local to the customer can create, store, and transmit records of authorization and access to a remote central processor in a secure manner.

It is yet a further object of the invention to provide a system and method where the remote central processor does not require the plurality of devices local to the customer to transmit the records of authorization and access in the order of their creation, or in any other order.

In general, in one aspect, the invention features a computer-implemented method for processing transactions, including authorization transactions and access transactions for service, comprising the steps of creating and storing on a user device authorization transactions and access transactions having timestamp information and duration information; transmitting records of said authorization transactions and said access transactions from said user device to a remote host processing device; analyzing said authorization transactions and said access transactions to match a specific authorization transaction with a specific access transaction based on said timestamp information and duration information; and creating a billing record based on said matched authorization transactions and access transactions.

Certain implementations of the present invention may include one or more of the following features. The method of the invention further comprises the step of detecting indicia of fraud based on the results of the step of analyzing said authorization transactions and said access transactions. The method of the present invention wherein said host processing device maintains a database of said authorization transactions and said access transactions, and further comprising the step of updating said database based on the results of the step of analyzing authorization transactions and access transactions.

Among the advantages of the invention may include one or more of the following. A plurality of devices local to the customer can create, store, and transmit records of authorization and access to a remote central processor in a secure manner. A user may access a service at any time, subject only to a prior authorization to be charged for that access. A user of a service can obtain multiple access to a service over a prescribed time interval, by establishing a single authorization. Additionally, a plurality of devices local to the customer can create, store, and transmit records of authorization and access to a remote central processor in a secure manner.

Other features and advantages of the invention will become apparent from the following description and from the claims.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE PRESENTLY PREFERRED EMBODIMENT

A system and method for processing transactions and determining billing will now be described with reference to the accompanying figures. The invention may be implemented in special-purpose hardware, software applications running on general-purpose hardware, or a combination of both.

In the following description, for the purposes of explanation, numerous specific details are set forth in order to provide a thorough understanding of the present invention. It will be apparent, however, to one skilled in the art that the present invention may be practiced without these specific details.

In general, the system and method of the present invention may include structure as well as means and steps for creating, storing, and transmitting transaction histories, and structure as well as means and steps for receiving, distributing, and processing transaction histories for such purposes as updating a database, generating billing records and detecting fraud.

Figure 1:
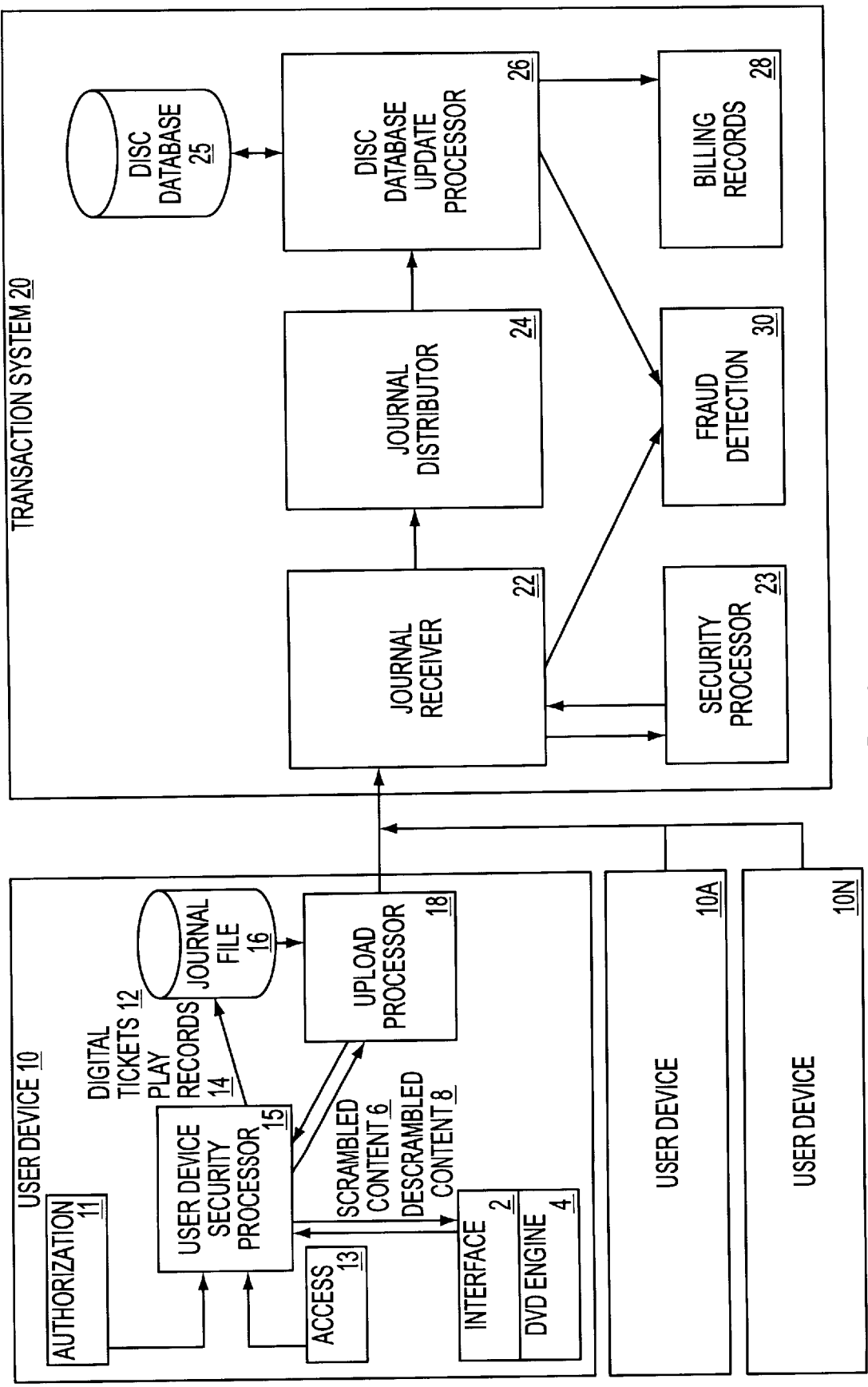
FIG. 1 provides an illustration of the system and method of the present invention comprising a user device and a transaction system.

FIG. 1 illustrates, in general, an exemplary system and method according to the present invention. Such a system may include a user device 10, or a plurality of user devices (as shown by 10A and 10N), electronically connected to a transaction processing system 20. In the illustrated example, the user device 10 creates, stores, and periodically transmits a list of authorization transactions 11 (which may be represented by digital tickets 12) and access transactions 13 (which may be represented play records 14) to the transaction processing system 20. The digital tickets 12 and play records 14 are stored in a journal file 16 until they are transmitted to the transaction system 20. Additionally, such a system may include an interface 2 for allowing the user to input authorization and access requests, and a DVD engine for playing the requested service.

After reaching the transaction system 20, the transmitted data comprising digital tickets 12 and play records 14 are received by a journal receiver 22 and distributed by a journal distributor 24 to a disc database update processor 26. In the present example, the disc database update processor 26 analyzes the transmitted data to create billing records 28, perform fraud detection 30, and update a disc database 25.

In a preferred embodiment, the system and method of the present invention may be a part of a Movie Transaction Processing (MTP) system and method. The MTP has two sources of input: previously processed activities stored in a database (such as disc database 25) and new activities stored in a journal (such as journal file 16) uploaded by a STB (such as user device 10).

However, in general, a system and method of the present invention as described above may be susceptible to tampering and result in unauthorized access of service, e.g. the digital tickets 12 and play records 14 on the user device 10 may be modified or removed, prior to their receipt by the transaction system 20. Additionally, content could be accessed directly, if it is not required that the subsystem creating the access history is not also the one enabling access to the content, which typically involves storing the content in a secured form and descrambling the content using a security subsystem.

To address the issue of tampering and unauthorized access of the content, the system and method of the present invention may include a security subsystem, e.g. user device security processor 15, in order to protect the history of content authorization and access, as well as permitting the descrambling of content only when a valid authorization is in effect. Accordingly, to prevent tampering, the security subsystem, namely, user device security processor 15, creates the actual content authorizations and protects them, preferably with a cryptographic signature, e.g. a MAC. The resulting authorizations are then added to the journal file 16. The journal file 16 may or may not necessarily be stored within the secure domain. When content access is requested, the user device security processor 15 enables actual content descrambling, subject to the existence of a valid (and protected) access authorization. The user device security processor 15 then outputs secured, again preferably with a signature, access records, which are written to the journal file 16 on the user device 10. During the period of the access request, the user device security processor 15 will then take the scrambled content, as shown by scrambled content 6, and allows descrambling of that content, as shown by descrambled content 8. Preferably, this is performed by descrambling the content within the user device security processor 15, but it can be done via many other well known industry methods.

In order to protect the content from tampering during the transmission to the transaction system 20, it is preferable to include a system and method for securely transmitting the journal file 16 from the user device 10 to the transaction system 20. In the preferred embodiment, a security processor 23 may be implemented on the transaction system 20, capable of sending to and receiving from the user device security processor 15 secured transmissions. This can be accomplished through many well-known techniques. A journal file 16 is uploaded to the transaction system 20 via this secure link and is then descrambled before being presented to the journal distributor 24. Finally, in the preferred embodiment, the user device security processor 15 uploads a counter for journal records, which have been created. More specifically, the user device security processor 15 generates transaction records, which may be stored in the journal file 16. These transaction records are periodically uploaded to the transaction system 20. It is inadequate to only guarantee the integrity of any single transaction record, because missing records may then not be detected. So, in addition to an integrity check on each record, e.g. via a cryptographic signature, the user device security processor 15, also maintains (internally) sufficient information to ensure that all the records are present. This may be accomplished by numbering each record in order, and storing the next number in the user device security processor 15. The user device security processor 15 can then detect missing records. If this internal count is also forwarded to the transaction system 20 when records are transmitted via the upload processor 18, the transaction system 20 can detect anomalies. As journal records are stored outside of the security domain, this ensures that all of the journal records have been transmitted. If anomalies are detected, the journal receiver 22 on the transaction system 20 write records to the fraud detection subsystem 30.

Figure 2:
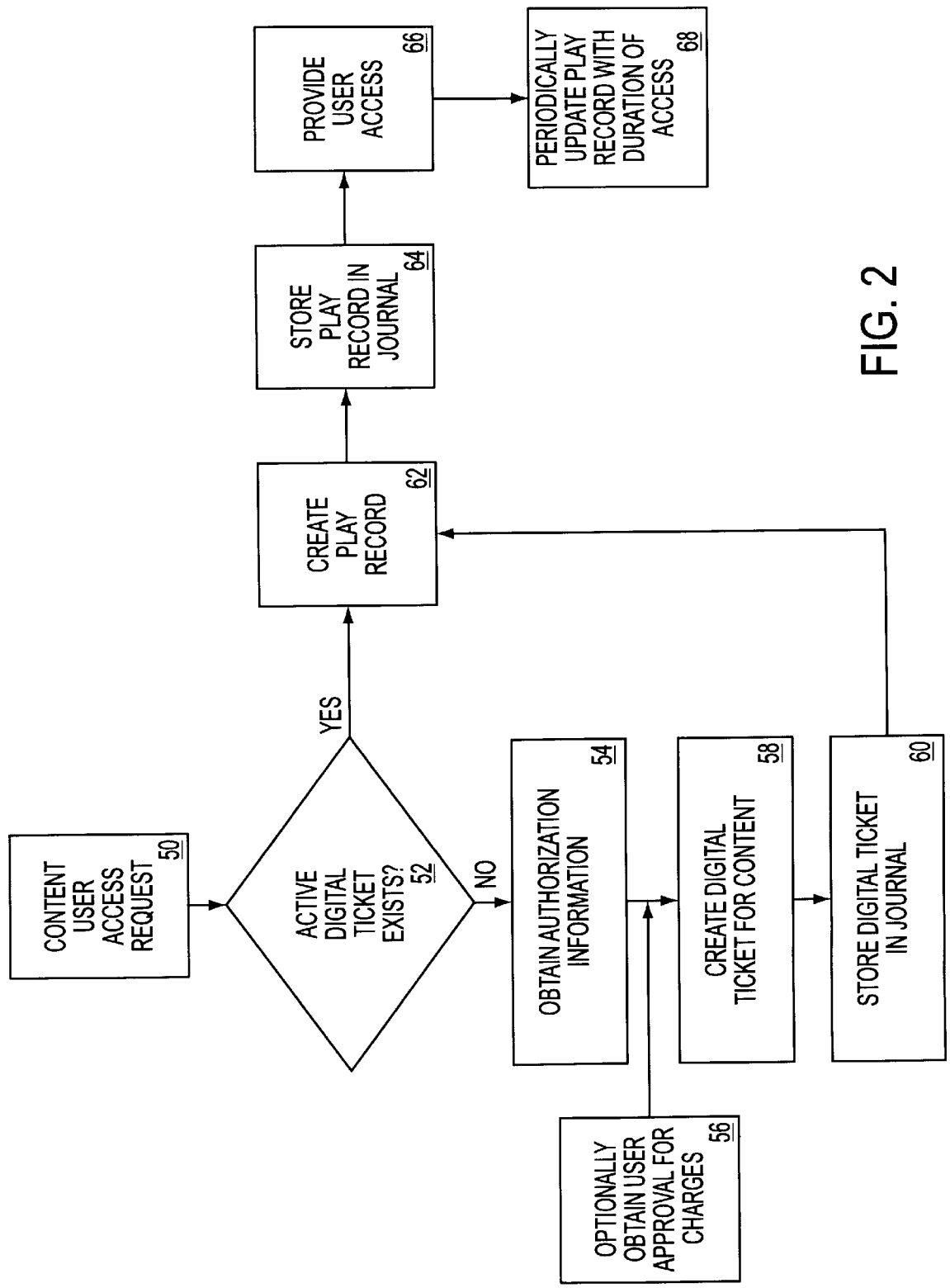
FIG. 2 illustrates an example of the structured process flow of a user device.

As FIG. 2 illustrates, the system and method of the present invention may have a structured processing flow for managing a user device 10. For example, when a user requests access to a content (step 50), the user device 10 determines whether an active digital ticket exists (step 52). If such ticket exists, user device 10 creates a play record (step 62), and then stores the play record in a journal (step 64). The user device 10 then provides user access (step 66) and periodically updates the play record to indicate the duration of access (step 68). However, if no active digital ticket exists, the user device 10 obtains authorization information (step 54) (e.g. price, duration, etc.), in order to create a digital ticket for accessing the content (step 58). After storing the digital ticket in the journal (step 60), the user device 10 creates a play record (step 62) and the processing flow is the same as above, continuing with step 64, step 66, and step 68. Optionally, if an active digital ticket does not initially exist, a user device may obtain user approval for charges (step 56) prior to creating a digital ticket for accessing the content (step 58).

In general, a system and method in accordance with the present invention provides to a user various options to access the service. In other words, the service user may select different service access (e.g. viewing) options, each of which will result in different set of charges. For example, a user may purchase a lower-priced access option, permitting unlimited multiple viewing of the content of a disc within a prescribed time period, i.e. the user may view the content of a disc as many times as he chooses within a forty-eight hour period starting from when he first views the content. Alternatively, the user may choose an access option wherein he may view the same movie content again as a "rental" within certain time period limitation on multiple viewing for an additional charge. Alternatively, the user may choose to purchase an unlimited access option, i.e. effectively the movie content of the disc, by opting for an unlimited viewing option without any time restrictions.

As implemented in a preferred embodiment, the system and method of the present invention provides for two types of contents or BCUs: "authored sell-through" (also known as "sell-through") and "rental." Sell-through BCUs may be played without limitation as to how many times and when the video content (or any part of it) may be played. The digital tickets generated by sell-through BCUs are not chargeable. In contrast, rental BCUs require a user to agree to be charged for accessing the rental BCU. As alluded to above, a user may convert a rental BCU to a sell-through BCU for an additional charge.

As should now be apparent, as implemented in a preferred embodiment, there are three types of digital tickets: "unlimited-play," "rental," and "conversion" (from rental to sell-through). A STB generates an unlimited-play digital ticket when the user accesses a sell-through BCU. A STB generates two types of digital tickets for a rental BCU, depending on its current state (as discussed below) as known by the STB. If the STB determines that the customer accessed a rental BCU, then the STB will generate a rental digital ticket. If the customer chooses to convert a rental BCU to a sell-through BCU, the STB will generate a conversion digital ticket. A conversion digital ticket may be thought of as a rental digital ticket that never expires. If an STB has a conversion digital ticket for a BCU when the BCU is played, the STB will only generate a play record, which will later be associated with an appropriate digital ticket. Preferably, there is only one type of play record. A BCU may be played any number of times when access is based on a conversion digital ticket. Therefore, a journal file 16 may contain multiple play records 14 associated with the same digital ticket 12.

In general, in order to facilitate transaction processing, the system and method of the present invention may include structures, means and steps for managing authorization transactions and access transactions as two distinct entities, and for managing these two entities as being in one of several states.

In a preferred embodiment of the present invention, authorization transactions and access transactions may be represented as digital tickets and plays, respectively. Accordingly, digital tickets may be in one of several states, while being stored in a database. Specifically, digital tickets can be in one of three states: "valid," "orphaned," or "ignored." Valid tickets are tickets that have been matched to a play record. Orphaned tickets are tickets that have no matching play record. Ignored tickets are tickets that will never create a billable transaction. Digital tickets can be thought of as being stored in three separate chains, according to their current state as described above. Additionally, plays can be in one of two states: "valid," or "orphaned." (Plays are never in the ignored state.) Thus, plays can also be thought of as being in two separate chains in accordance with their current state as described above. The ticket chains are distinct from the play chains, which gives a total of five chains. Moving a digital ticket or play from one chain to another means changing its state.

Figure 3:
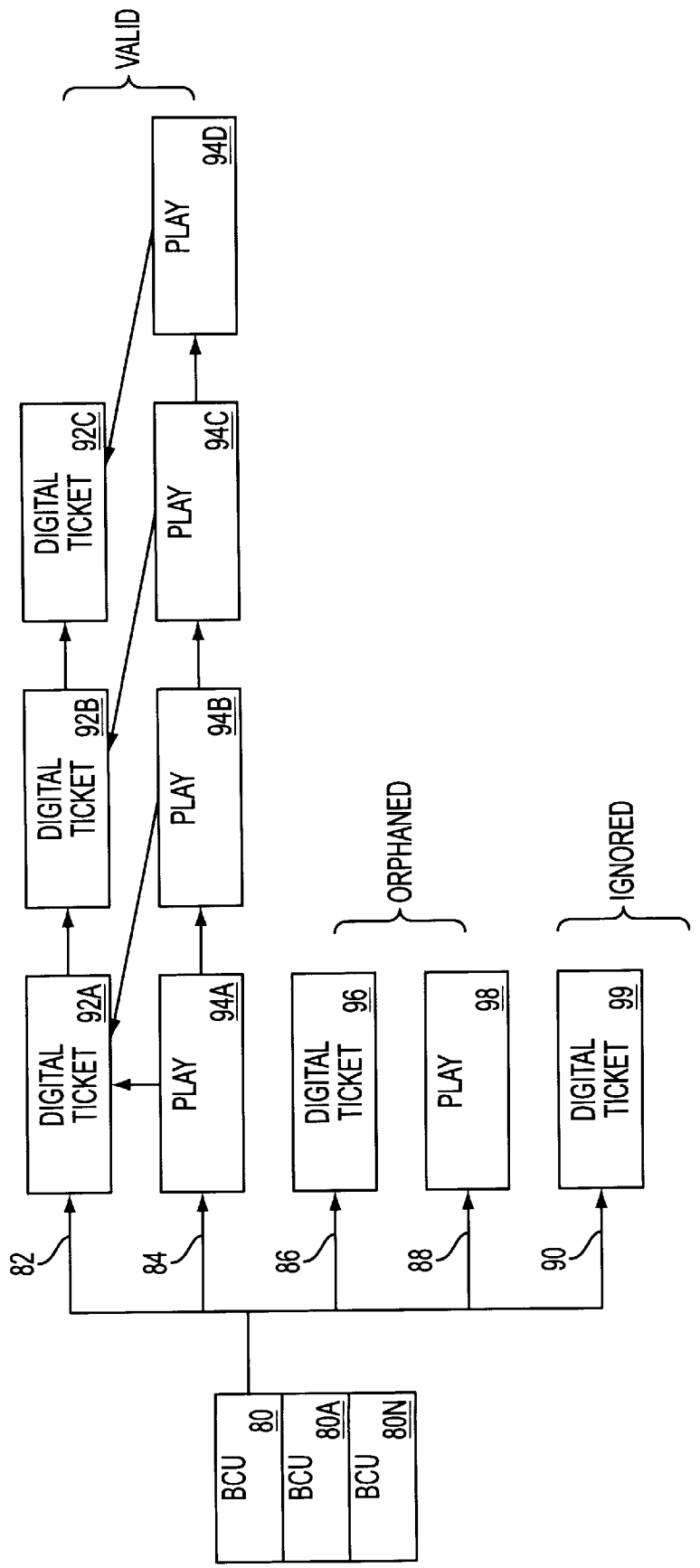
FIG. 3 illustrates the concept of classifying digital tickets and plays as being in various chains or states.

FIG. 3 illustrates exemplary digital tickets and plays as distinct entities and as being in one the five states or chains described above. In FIG. 3, chain 82 is a valid digital ticket chain, and all digital tickets in this chain are in the valid state. Chain 84 is a valid play chain, and all plays in this chain are also in the valid state. Chain 86 is an orphaned digital ticket chain with one digital ticket in the orphaned state. Chain 88 is an orphaned play chain with one play also in the orphaned state, and finally, chain 90 is an ignored digital ticket chain with a digital ticket in the ignored state. All of the five chains of digital tickets and plays shown are associated with BCU 80.

Note that in the illustrated example, digital tickets 92A, 92B, and 92C are all valid because they are matched with plays 94A, 94B, 94C, and 94D. In general, in a preferred embodiment of the system and method of the present invention, when a play matches a rental ticket, the play "validates" the ticket. A rental ticket moves to the valid chain when the MTP finds a matching play. For a play to match a rental ticket, the play's start time must fall within the duration of the ticket and it must be from the same account as the ticket. For a play to match a conversion ticket, it needs to start after the ticket and the ticket must be from the same account. When a rental or a conversion ticket enters the valid chain, the MTP sends a charge to the account associated with the ticket. When a rental or a conversion ticket moves from the valid chain to the orphaned chain or the ignored chain, the MTP sends a charge reversal to the associated account. Neither a conversion ticket nor an unlimited-play ticket needs a play to validate it. It enters the valid chain immediately. The MTP does not send charges or reversals for unlimited-play tickets.

The system and method of the present invention may also have a structured flow for processing a transaction history, which may include analyzing the arriving transactions and any earlier reported transactions in a database to determine what activity may be chargeable. For example, more than one access transaction may exist for the same authorization transaction. Also, an authorization may exist with no matching access. Only authorization transactions having at least one corresponding access transaction are chargeable, unless the authorization is for unlimited access, which is chargeable without any corresponding access transactions. In accordance with the present system and method, the first access transaction that validates an authorization causes the customer or user to be charged. Subsequent access transactions that match an already validated authorization will not create additional charges. Also, an authorization transaction without a matching access transaction does not create a chargeable event, and vice versa.

In the illustration, where viewing of video disc content is the service being accessed, validated authorizations may not overlap. If a newly validated authorization overlaps an earlier validated authorization, the system and method adjusts the starting time for the new authorization to the time of the access that validated it and generates a charge. The time of that access transaction must be after the ending time of the earlier authorization, otherwise the access would have matched the earlier authorization. By adjusting the starting time of the later authorization, the account gets the full access rights allowed by the duration of both transactions. The resulting durations do not need to be contiguous.

In general, the system and method of the present invention preserves the order in which transactions arrive which may, but need not, correspond to the order in which they occurred. Earlier transactions may arrive after later ones, e.g. an access transaction or its matching authorization transaction may arrive first. The system and method will produce the same results regardless of the order the transactions arrive. However, an access transaction should preferably be matched to the earliest possible authorization. If an earlier authorization transaction whose duration would cover an access transaction that has already been matched to a later authorization transaction arrives, the system and method preferably reverses the charges for the later authorization transaction and matches the access transaction to the earlier authorization transaction and then generates a new charge.

As implemented in a preferred embodiment, the MTP processes a collection of new digital tickets and plays for a BCU in the order they exit the journal file. Since each journal entry has an associated date and time, the order in which the MTP processes them need not correspond to the order they actually occurred. Similarly, the MTP is capable of processing digital tickets and plays from various STBs, without requiring the STBs to transmit the tickets and plays in the order they actually occurred. There is also no requirement to process digital tickets before plays or vice versa. The resulting charges to the customer will be the same.

In general, the system and method of the present invention may use a structured decision process to manipulate authorization transactions and access transactions.

In a preferred embodiment of the present invention, with regard to digital tickets, when a new digital ticket enters the process, the MTP first tries to place it in the ignored chain. For example, if there is a valid conversion ticket with a start time earlier than the start time on the new rental or conversion ticket, any plays that would match the new ticket will also match the conversion ticket. So, there is no need to keep the new ticket, and it can be placed in the ignored chain. For an unlimited-play ticket, if there is already a ticket with an earlier start time, the new ticket can be place directly into the ignored chain. All rental tickets, which the MTP does not ignored immediately, enter the database in the orphaned chain.

In a preferred embodiment of the present invention, with regard to plays, when a play arrives, the MTP first tries to match it to a valid ticket. If the MTP matches the play with a valid ticket, it marks the play as valid and assigns it to the ticket, by storing the serial number of the valid ticket with the play. The MTP will not stop with the first match it finds. If the play does not match a ticket, the MTP tries to match it to an orphaned ticket. Again, the MTP will try to find the earliest possible match in the orphaned chain. If the MTP finds a match with an orphaned ticket, the play validates the ticket, the ticket moves to the valid chain, and the play goes into the valid play chain. Ignored tickets stay ignored, so the MTP never tries to match plays to them. If the MTP does not find a match for the play, it marks the play as orphaned.

In a preferred embodiment of the present invention, when a play validates a ticket, the MTP goes through several steps before actually placing the ticket in the valid chain. These steps vary according to whether the ticket is a rental, conversion, or unlimited-play ticket, as illustrated by the following processing scenarios.

For unlimited-play tickets, if there is no ticket for the BCU yet, the new ticket goes directly into the valid chain. If there is a ticket, it will have a start time after the new ticket, else the new ticket would already be in the ignored chain. So, the old ticket moves to the ignored chain and the new ticket takes its place in the valid chain. This results in only one unlimited-play ticket in the valid chain for any BCU. For a conversion ticket, the MTP traverses the valid chain from the latest ticket to the earliest, looking for the proper place for the new ticket. As it moves along, the MTP will move any tickets, rental or conversion, having a start time later than the new ticket to the ignored chain.

For rental tickets, the MTP traverses the valid chain, from the latest to the earliest to determine where to place the new ticket according to its start time. When it finds the proper place, it compares the new ticket with the next earlier and next later ticket from the same account. Rental tickets from the same account may not overlap. If a new rental ticket overlaps an existing rental ticket either at the beginning of its duration or at the end, the MTP must re-arrange the tickets, so that the customer gets the full benefit of the durations for which the MTP charges the account. If the new ticket overlaps the beginning of a later ticket, the MTP moves the later ticket to the orphaned chain and moves all of the plays associated with that ticket to the orphaned chain as well. The MTP also creates billing credits. In other words, those plays might belong with the new ticket and will match it when the MTP goes back through the orphaned plays later. Since they occurred during the earlier ticket, the MTP should not charge the account for the later ticket. If the new ticket overlaps the end of an existing ticket, the MTP shifts the start time of the new ticket to the start time of the play that validated it. This is to ensure that if the MTP charges the account twice, that the customer gets the full benefit of the two durations.

When the MTP has finished processing new journal entries, some plays and tickets might be in the orphaned chain. Because of the order in which the data arrived may not be in the order in which the actual rental and play activities occurred, the MTP may need to go through the orphaned chain to make the correct matches. It does this by trying to process any plays left in the orphaned chain. It traverses the orphaned chain and sends each play through the same process as a new play.

In one embodiment of the system and method as incorporated in the MTP, the MTP comprises of three main subsystems: journal dequeue, journal play, and journal digital ticket.

The journal dequeue subsystem receives the records of digital ticket and play from the front end processing (FEP), encased in a journal file with a header which states the journal record numbers present within the journal. From the journal, this subsystem then extracts the individual ticket and play records for subsequent processing.

The journal digital ticket subsystem receives a digital ticket and a BCU for which the ticket was generated. The main purpose of digital ticket processing is to find a matching play record in the list and create a billable event transaction. In the case of BCUs, which are listed as sell-through, all subsequent digital tickets will be ignored, since no further charges can be made. An exception to this is when a digital ticket is created before a BCU is converted to sell-through. Even if the sell-through transaction is listed before this ticket, the MTP will search for a matching play record and bill the customer for the rental in addition to creating the sell-through charge.

Additionally, the journal digital ticket subsystem ensures that digital tickets created for the same account and BCU combination do not overlap. If an overlap is found, the new ticket will have its time shifted such that its start time no longer overlaps the end time of a previous ticket. This may have ramifications down the line, as sliding one ticket may impact another ticket further down the line. Each subsequent ticket in the line may be shuffled to ensure no overlapping times within a digital ticket chain.

The journal play subsystem will try to match the received play record to a digital ticket in the orphaned chain. If it finds a match, it will create a billable transaction and enqueue it to the billing queue. It will also insert the new play and digital ticket into the valid chain. The play processing function also detects possible fraud by checking for duplicate BCUs or overlapping play records.

Figure 4:
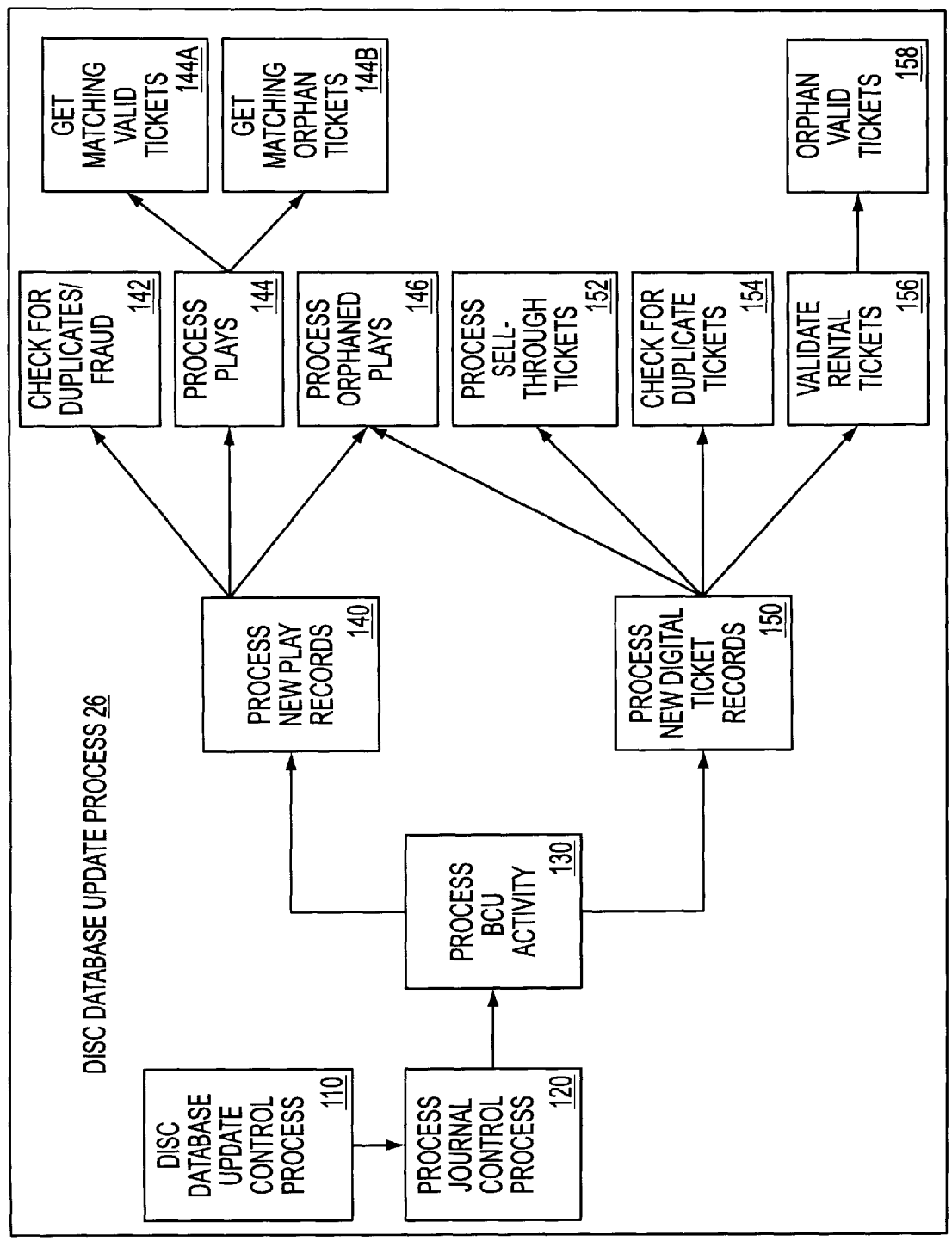
FIG. 4 illustrates an example of a database update process for processing transactions in accordance to the present invention.

FIG. 4 illustrates, in general, an exemplary database update processor 26 to process transactions, according to the system and method of the present invention. In this example, disc database update processor 26 comprises of the following functions or processes: disc database update control process 110, process journal control process 120, process BCU activity 130, process new play records 140, process new digital tickets 150, check for duplicates/fraud 142, process plays 144, get matching valid ticket 144A, get matching orphaned tickets 144B, process orphaned plays 146, process sell-through tickets 152, check for duplicate tickets 154, validate rental ticket 156, and orphan valid tickets 158. These functions update the disc database 28.

Disc database update control process 110 dequeues the journal from the journal queue, by calling the finctions to unpack and process the journal.

Process journal control process 120 receives the journal in the form of a BCU array and walks through each element's list of tickets and plays. As many BCUs as possible are processed within its own thread (subprocess) to increase performance. The process will take a list of BCU activities from the array and send each element of the array to the function of process BCU activity 130.

Process BCU activity 130 is a process that receives one element of the BCU array and walks through each BCU record in the list and process it as a play or a ticket. The BCU must already exist in the disc for processing to continue, otherwise the transaction is marked as fraudulent and a transaction will be sent to a fraud detection function. Likewise, if the BCU is listed in the database as stolen or recalled, a transaction will be sent to a fraud detection function. Other combinations of plays and BCUs will result in fraud detection transactions being generated. If the record passes the fraud detection processes, it will be sent to the proper BCU processing function, e.g. process new play records 140 or process new digital ticket records 150 for further processing.

Process new play records 140 is a process that receives, from process BCU activity 130, a new play record from the journal currently being processed. It checks the play to determine whether it is a duplicate, using the function of check for duplicates/fraud 142, and then uses the function of process plays 144 to validate the play record. If the play is validated, it is inserted into the valid chain. Finally, this process calls the process orphan plays 146 function to process any plays, which may have become orphaned.

Check for duplicates/fraud 142 is a process that checks a new play to see if it matches an existing play in any chain. It also checks the frequency of the plays for possible fraudulent activities, e.g. an unusually large number of plays during a short time period, or simultaneous plays of the same BCU using multiple STBs. If any duplicate or fraud is detected, it returns an appropriate indicator for further processing.

Process plays 144 is a process that tries to validate a play by matching it to either a valid or an orphaned digital ticket. First, the play is checked against already validated digital tickets by using the function of get matching valid tickets 144A. If get matching valid tickets 144A found a matching valid ticket, the play is then marked as valid. If no valid ticket is found, get matching valid tickets 144A will look in the orphaned chain by using the function of get matching orphaned tickets 144B. If a matching valid ticket is found in the orphaned list, both the play and ticket are marked as valid. If no matching ticket is found, the play is marked as an orphaned play.

Get matching valid tickets 144A is a function that searches a list of valid digital tickets for a ticket with a time span which covers the start time of the current play record. The ticket must be for the same account and must encompass the start time of the play record being processed. The fuction will check for the play to be covered by a "slidden" ticket if no ticket can be found which actually covers the play's start time. For example, if ticket 1 covers ten time units from time unit 0 to time unit 10, ticket 2 covers ten time units from 15 to 25, play 1's start time is at time unit 0, and play 2's start time is at time unit 15. Then play 1 would match ticket 1, and play 2 would match ticket 2, because the time span of ticket 1 and ticket 2 cover each of the plays. However, if ticket 3 exists and it covers ten time units from time unit 12 to time unit 22, then play 2 would match ticket 3, because ticket 3's start time of time unit 12 is earlier than ticket 2's start time of time unit 15. If no ticket is found, the finction will return a no match indicator.

Get matching orphaned tickets 1 44B is a function that searches the orphaned ticket chain for a ticket whose duration covers the start time of the play record currently being processed. If a ticket is found, it will be returned. If no record is found, the function returns a no match indicator.

Process orphaned plays 146 is a process that searches through the orphaned play chain to validate plays against the existing digital tickets for the current BCU. Potentially, by validating the current play, another play may become orphaned. If this occurs, the chain will be rewound to the point of the last validated entry and the process will attempt to validate or ignore the newly orphaned play. If a play cannot be validated, the play will remain in the orphaned chain.

Process new digital ticket records 150 is a process that receives a new digital ticket from the process named process BCU activity 130. Using the function called check for duplicate tickets 154, the process named process new digital ticket records 150 first checks the digital ticket to determine whether it is a duplicate of a ticket already in the chain of activities for the BCU. If the ticket is a duplicate, it will be ignored. Otherwise, the status of the BCU is examined to determine if it has been converted or is a sell-through prior to the timestamp on the digital ticket. If the ticket was created after the BCU was converted, the ticket will be place in the ignored chain and no further processing will be performed. If there are no conversions in the BCU list, the type of the ticket will be analyzed. If this ticket is a sell-through, the process for creating sell-through BCUs will be used next. After the sell-through process has completed, another will clean up any orphaned plays created by the conversion.

Continuing with process new digital ticket records 150, if the ticket is not a sell-through or conversion and there are no previous conversions, the status of the BCU is checked as described below. If the BCU is currently listed as new, the digital ticket will represent the first play of the disc by any account. The status of the BCU will then be changed to "used." The status of the ticket will be changed to an orphaned state, which means that the ticket currently has no matching play record to validate it. The ticket will then be inserted into the chain of activity associated with the BCU. After the ticket has been inserted, the finction named process orphaned plays 146 will be used in order to validate the digital ticket just received. The function named process orphaned plays 146 will walk through the list of plays for the BCU to attempt to match the digital ticket just entered into the BCU list. If a match is found, the status of the ticket is changed to valid, which means a billing transaction can be created for this ticket.

Process sell-through digital tickets 152 is a process that will change all tickets in the chain for the BCU to the ignored state, if the dates of the tickets in the chain are later than the current ticket. This is because any digital tickets created since a sell-through record was made would be free of charge, and therefore should be ignored. Billing credits are created for those tickets placed in the ignored state. The new digital ticket is inserted into the list for activity for this BCU. The status of the BCU is updated to "converted" and a billing transaction is created to charge the customer for the conversion. Check for duplicate tickets 154 is a function that receives a digital ticket and check the list of digital tickets associated with this BCU to determine whether duplicates exist. If a duplicate record is found, the finction will return an indicator, in order to create a fraud detection transaction.

Validate rental digital tickets 156 is a function that inserts a validated rental ticket into the valid chain. The finction will determine if this is the first play for this BCU, the first-time rental for the current account, or a non-first-time-rental for the current account. The status of the BCU results in different charges, e.g. a status of first play for a BCU is free, whereas other status may incur different charges.

Orphan valid tickets 158 is a process that reverses the charges associated with a digital ticket whose status has been changed to ignored. All plays associated with this digital ticket will be moved to the orphaned chain.

In general, the system and method of the present invention may include a structure, means and method for reversing sell-through BCUs.

In the preferred embodiment of the present invention, the function of reverse sell-through digital ticket receives the BCU to be reversed. It searches for the sell-though digital ticket and changes its status to ignored by calling a function named orphan or ignore valid digital ticket, which will move the sell-through digital ticket to the ignored ticket chain and move all plays associated with this digital ticket to the orphaned play chain. Also, billing transactions will be generated to reverse the sell-through transaction. Finally, the finction named reverse sell-through digital ticket traverses the orphaned play chain to find the earliest play associated with the sell-through digital ticket. Once found, the function generates a digital ticket. The function named process orphan plays is used to validate this digital ticket to the newly orphaned plays, which fall under the same account number and within the proper time span. Billing transactions will be generated for each digital ticket validated by these plays. The process will be repeated until all plays have been validated to the digital tickets.

The following discussion describes and solves most of the possible scenarios related to processing digital tickets and plays as they arrive in a journal and are placed in the disc database.

Description of Diagrams

In all diagrams, time goes from left to right. The earliest digital ticket or play is the farthest left and the latest is the farthest right. The line at the top of a diagram (+---+---+) represents units of time and is there to compare the relative order of tickets and plays in different diagrams. For a digital ticket (|--1--fr->) the vertical bar | (pipe) on the left represents the start time and the greater than sign > on the right represents its stop time. A play is represented by a carat ^ which indicates only its start time. All objects related to the same account appear in the same color. The number inside a digital ticket or the letter below a play is used to refer to that object in the text discussion of the scenario. The letters "fr", "afr", or "st" inside a digital ticket indicate that it is a first-rental, account-first-rental, or sell-through, respectively. Subsequent-rentals do not have letters. The words "Valid", "Orphan", or "Ignore" at the beginning of a line indicate the chain in which the objects belong. Note that the chains in the disc database are actually stored in reverse chronological order. This means that the first item in a chain will be the farthest right (or latest) item in a diagram. (Note: DDB stands for disc database.)

DDB Example

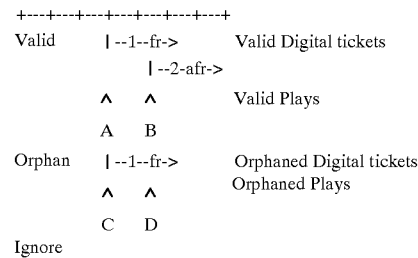

The following statements apply to all digital tickets and plays for the same BCU.

Processing Rules: Sell-Through Processing

1. If a sell-through digital ticket exists, it will always be the first item (i.e. latest) in the valid chain.

2. A sell-through digital ticket does not need a play to validate it.

3. Any existing valid digital ticket whose start time is later than the start time of a sell-through will be moved to the ignore chain when the sell-through is inserted.

4. Any new digital ticket whose start time is later than the start time of an existing sell-through will be placed directly into the ignore chain. Any plays that may have validated the ticket get attached to the sell-through.

5. A sell-through ticket whose start time is earlier than the stop time of a rental ticket does not affect the rental ticket.

Processing Rules: Sell Through Reversal

1. The sell-through ticket is ignored and a billing transaction is sent to reverse the sell through charge.

2. All plays for the sell through digital ticket are orphaned.

3. Virtual digital tickets will be generated to cover the plays, which were validated to the sell through digital ticket.

4. Virtual digital tickets will not contain a MAC and will never get downloaded to an STB.

5. All digital tickets generated for the orphaned plays will be billed to the reversing account.

Processing Rules: Rental-Processing

1. A rental digital ticket must have a matching play from the same account to validate it. The play must not match a sell-through or another valid rental from the same account.

2. Rental digital tickets from the same account may not overlap.

3. If a newly validated rental ticket's start time overlaps the stop time of an existing valid rental ticket from the same account, set the start time of the new ticket to the start time of the play that validated it. This is called a "slidden" ticket. The new ticket's original start time is also stored.

4. If the only valid ticket that a play matches is a slidden ticket and the play falls after the original start time, but before the slidden time, orphan the ticket and immediately validate it using the new play. The start time of the ticket is again slidden to the start time of the new play.

5. If a newly validated rental ticket's stop time overlaps the start time of an existing valid rental ticket from the same account, orphan the existing rental ticket.

The following are some illustrative scenarios relating to processing authorization transactions and access transactions.

Scenario 1: No activity. First-rental arrives and account-first-rental arrives

Account 1 buys the disc and uses the free first rental. During the rental window, account 1 loans the disc to account 2. Account 2 rents it. Since account 2 did not purchase the disc, they are charged for an account-first-rental.

No activity exists for a BCU. The journal from account 1 arrives before the journal from account 2.

Account 1, STB 1

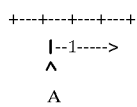

Ticket 1 goes into the orphan chain. Play A validates ticket 1, which is billed as the first-rental.

Account 2, STB 1

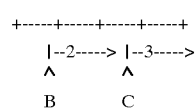

Ticket 2 goes into the orphan chain. Play B validates ticket 2. Because the first rental already exists and is earlier than ticket 2, and there is no other activity on this BCU from the same account, ticket 2 is billed as an account-first-rental. Ticket 3 goes into the orphan chain. Play C validates ticket 3. Because earlier activity exists on this BCU from the same account, ticket 3 is billed as a subsequent-rental.

DDB Before

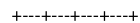

DDB After

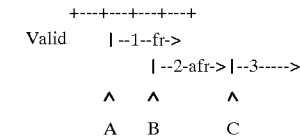

| Records sent to Billing | | |
|---|---|---|
| Ticket | Type of Charge | Reversal |
| 1 | first-rental | |
| 2 | account-first-rental | |
| 3 | subsequent-rental | |

Scenario 2: first-rental becomes subsequent-rental

Account 1 buys the disc and uses the free first rental on the STB in the living room. After the first rental window is over, account 1 rents the disc on the STB in their bedroom. During the second rental window, account 1 loans the disc to account 2. Account 2 rents it. Since account 2 did not purchase the disc, they are charged for an account-first-rental. The bedroom STB from account 1 calls in first, then account 2's STB calls, and finally the living room STB from account 1 calls.

Take the chains as they appear after scenario 1. One journal arrives from a second STB on account 1.

Account 1, STB 2

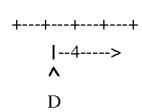

Ticket 4 goes into the orphan chain. Play 4 validates ticket 4, which is billed as the first-rental. This causes two records to be sent to billing for ticket 1—first a reversal and then a subsequent-rental. Tickets 2 and 3 are not affected.

DDB Before

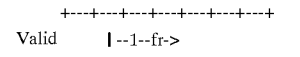

DDB After

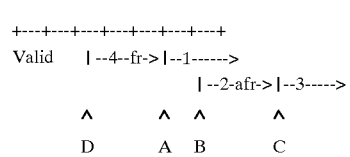

| Records sent to Billing | | |
|---|---|---|
| Ticket | Type of Charge | Reversal |
| 1 | first-rental | TRUE |
| 1 | subsequent-rental | |
| 4 | first-rental | |

Scenario 3: first-rental becomes afr, afr becomes subsequent-rental

Account 2 buys the disc and uses the free first rental on their kids' STB. Account 1 borrows and rents the disc. Since account 1 did not purchase the disc, they are charged for an account-first-rental. After account 2's first rental window is over, account 2 rents the disc on the parents' STB twice. Account 1's STB calls in first, then the parents' STB from account 2 calls, and finally the kids' STB from account 2 calls.

Take the chains as they appear after scenario 1. One journal arrives from a second STB on account 2.

Account 2, STB 2

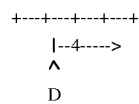

Ticket 4 goes into the orphan chain. Play 4 validates ticket 4, which is billed as the first-rental. This causes two records to be sent to billing for ticket 1—first a reversal and then an account-first-rental. Two records are sent to billing for ticket 2—first a reversal and then a subsequent-rental. Ticket 3 is not affected.

DDB Before

```
+---+---+---+---+---+---+---+
Valid      | --1--fr->
                    | --2-afr-> | --3----->
                    ^       ^         ^
                    A       B         C
```

DDB After

```
+---+---+---+---+---+---+---+
Valid      | --1-afr->
| --4--fr->          | --2-----> | --3----->
^          ^         ^           ^
D          A         B           C
```

| Records sent to Billing | | |
|---|---|---|
| Ticket | Type of Charge | Reversal |
| 1 | First-rental | TRUE |
| 1 | Subsequent-rental | |
| 2 | Account-first-rental | TRUE |
| 2 | Subsequent-rental | |
| 4 | First-rental | |

Scenario 4: subsequent-rental arrives and gets slidden

Take the chains as they appear after scenario 1. One journal arrives from a second STB on account 1.

Account 1, STB 2

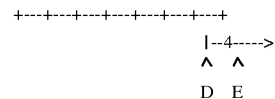

Ticket 4 goes into the orphan chain. Play D matches ticket 1. Play E validates ticket 4, which is billed as a subsequent-rental. Ticket 4 becomes a slidden ticket, so its start time is set to the start time of play E. Tickets 1, 2, and 3 are not affected.

DDB Before

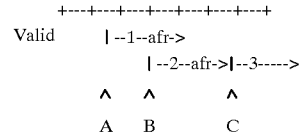

DDB After

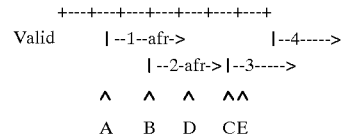

| Records sent to Billing | | |
|---|---|---|
| Ticket | Type of Charge | Reversal |
| 4 | subsequent-rental | |

Scenario 5: Play matches slidden ticket before slidden start time

Take the chains as they appear after scenario 4. One journal arrives from the first STB on account 1.

Account 1, STB 1

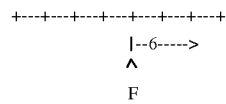

Ticket 6 goes into the orphan chain. Play F matches ticket 4, before the slidden start time and after the original start time. This causes ticket 4 to get orphaned, which causes play E to get orphaned. A reversal is sent to billing for ticket 4. Ticket 4 is immediately revalidated using play F and the start time of ticket 4 is slidden to the start time of play F. A subsequent-rental record is sent to billing. Orphaned plays are then processed which matches play E with ticket 4. Ticket 6 remains in the orphan chain. Tickets 1, 2, and 3 are not affected.

DDB Before

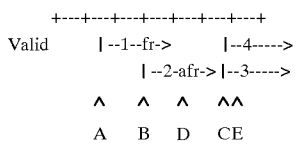

-continued

DDB After

```
                +---+---+---+---+---+---+
       Valid    | --1-fr-> |--4----->
                        | --2-afr->|--3----->
                ^    ^ ^ ^ ^^
                A    B D F CE
       Orphan              |--6----->
```

Records sent to Billing

| Ticket | Type of Charge | Reversal |
|---|---|---|
| 4 | subsequent-rental | TRUE |
| 4 | subsequent-rental | |

Scenario 7: Sell-through arrives

Take the chains as they appear after scenario 1. One journal arrives from the second STB on account 1.

Account 1

```
                +---+---+---+---+---+---+---+
                |--4--st->
                ^       ^
                D       F
```

Ticket 4 gets validated automatically because it is a sell-through. Ticket 3 gets moved to the ignore chain because its start times is after the sell-through's start time. This causes play C to get orphaned. A reversal is sent to billing for ticket 3. A charge is sent to billing for the sell-through ticket 4. Orphaned plays are then processed which matches plays C, E, and F with ticket 4. Ticket 3 remains in the ignore chain. Ticket 1 is not affected.

DDB Before

```
                +---+---+---+---+---+---+
       Valid    | --1-fr->
                        | --2-afr-> |--3----->
                ^    ^       ^
                A    B       C
```

DDB After

```
                +---+---+---+---+---+---+
       Valid    | --1-fr->     |--4--st->
                        | --2-afr->
                ^    ^       ^  ^  ^
                A    B       E  C  F
       Ignore               |--3----->
```

Records sent to Billing

| Ticket | Type of Charge | Reversal |
|---|---|---|
| 3 | subsequent-rental | TRUE |
| 4 | sell-through | |

Scenario 7: Sell-through arrives from STB 2 and overlaps earlier STB 1 rental

Take the chains as they appear after scenario 4.4. One journal arrives from the second STB on account 1.

Account 1

```
                +---+---+---+---+---+---+
                |--6--st->
                ^  ^  ^
                F  G  H
```

Ticket 6 gets validated automatically because it is a sell-through. Tickets 2, 3, and 4 get moved to the ignore chain because their start times are after the sell-through's start time. This causes plays B, C, D, and E to get orphaned. A reversal is sent to billing for tickets 2, 3, and 4. A charge is sent to billing for the sell-through ticket 6. Plays F, G, and H are then matched with ticket 6. Orphaned plays are then processed which matches plays B, C, D, and E with ticket 6. Tickets 2, 3, and 4 remain in the ignore chain. Ticket 1 is not affected.

DDB Before

```
                +---+---+---+---+---+---+---+
       Valid    | --1-fr->           | --4----->
                        | --2-afr->|--3------>
                ^    ^    ^   ^^
                A    B    D   CE
```

DDB After

```
                +---+---+---+---+---+---+---+
       Valid    | --1-fr->
                        | --6--st->
                ^    ^^     ^^     ^^^
                A    FB     DG     CEH
       Ignore                      |--4----->
                        | --2--afr->|--3------>
```

Records sent to Billing

| Ticket | Type of Charge | Reversal |
|---|---|---|
| 4 | subsequent-rental | TRUE |
| 3 | subsequent-rental | TRUE |
| 2 | account-first-rental | TRUE |
| 6 | sell-through | |

Scenario 8: Sell-through reversal

Take the data as it appears in scenario 7. The CSR initiates a reversal for the sell-through generated by account 1. Ticket 6 gets sent to the ignored chain. Plays F, G, H, B, C, D and E are orphaned. A virtual digital ticket (VI) is generated using the start play time of play F. Plays F, D and G are validated to ticket VI. Another virtual ticket (V2) is generated, using the start play time of play B. Only play B validates to ticket V2. Another virtual digital ticket (V3) is generated using the start play time of play C. Only play C validates to ticket V3. Finally, a virtual digital ticket (V4) is generated using the start time of play E. Plays E and H validate to ticket V4. Ticket I is not affected.

DDB Before

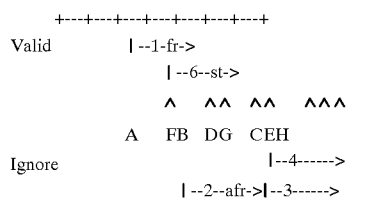

DDB After

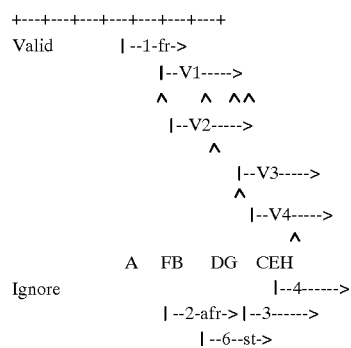

| | Records sent to Billing | | |
|---|---|---|---|
| Ticket | Type of Charge | Reversal | Bill Account |
| 6 | sell-through | TRUE | 1 |
| V1 | subsequent-rental | | 1 |
| V2 | Subsequent-rental | | 1 |
| V3 | subsequent-rental | | 1 |
| V4 | subsequent-rental | | 1 |

In the foregoing specification, the invention has been described with reference to specific embodiments thereof. Other embodiments are within the scope of the following claims.

For example, an authorization transaction may be implemented as an entity other than a digital ticket, an access transaction may be implemented as an entity other than a play.

What is claimed is:

1. A computer-implemented method for processing transactions, including authorization transactions and access transactions for service, comprising the steps of:
   creating and storing authorization transactions and access transactions on a user device, each of said authorization transactions and said access transactions having corresponding timestamp information and duration information;
   transmitting records of said authorization transactions and said access transactions from said user device to a remote host processing device;
   analyzing said authorization transactions and said access transactions at said host processing device to match a specific authorization transaction with a specific access transaction based on said timestamp information and duration information; and
   creating a billing record based at said host processing device on said matched authorization transactions and access transactions.

2. The method according to claim 1 further comprising the step of detecting indicia of fraud based on the results of the step of analyzing said authorization transactions and said access transactions.

3. The method according to claim 2 wherein said indicia includes numerous access transactions during a predetermined short time duration on said user device or simultaneous access for the same service on multiple said user devices.

4. The method according to claim 1, wherein said host processing device maintains a database of said authorization transactions and said access transactions, and further comprising the step of updating said database based on the results of the step of analyzing authorization transactions and access transactions.

5. The method according to claim 1, wherein the step of transmitting said records to said host processing device occurs periodically.

6. The method according to claim 1 further comprising the step of securing said records of authorization transactions and access transactions.

7. The method according to claim 6, wherein said step of securing is performed prior to and during the step of transmitting said records of authorization transactions and access transactions.

8. The method according to claim 1 further comprising the step of providing multiple access transactions to a service over a prescribed time interval under a single authorization transaction.

9. The method according to claim 8 further comprising the step of creating a single billing event for said multiple access transactions.

10. The method according to claim 1, wherein said access transactions may occur anytime during the time span of said authorization transaction.

11. The method according to claim 1, wherein said step of analyzing and creating are performed for a plurality of said user devices.

12. The method according to claim 1, wherein said step of transmitting records comprises transmitting said records in any chronological order.

13. A system for processing transactions, including authorization transactions and access transactions comprising:
   a user device having an interface and an associated service access device which services only the associated user device, said associated service access device being contained within said user device;
   a remote transaction processing system for receiving and processing transactions from the user device and for generating transactions and billing records; wherein the user device and remote transaction processing system are electronically linked, and
   the remote transaction processing system comprises a journal receiver, a journal distributor, a disc database update processor, a security processor, and interfaces to a fraud detection subsystem and to a billing records subsystem.

14. The system according to claim 13, wherein the service access device comprises a digital video disc player subsystem.

15. The system according to claim 13, wherein the user device further comprises memory for storing authorization transactions and access transactions.

16. The system according to claim 13, wherein
   the user device further comprises a data input for inputting authorization requests and access requests.

17. The system according to claim 13, wherein the user device comprises a user device security processor for securing records of authorization transactions and access transactions.

18. A system for processing transactions, including authorization transactions and access transactions comprising:

a user device having an interface and an associated service access device which services only the associated user device, said associated service access device being contained within said user device;

a remote transaction processing system for receiving and processing transactions from the user device and for generating transactions and billing records; wherein the user device and remote transaction processing system are electronically linked, and the remote transaction processing system comprises a disc database update processor for matching authorization transactions and access transactions based on timestamp information and duration information and for creating billing records based on the matched transactions.

19. A plurality of memory devices for storing computer-readable instructions and for processing transactions, comprising:

instructions for creating and storing authorization transactions and access transactions on a user device, each of said authorization transactions and said access transactions having corresponding timestamp information and duration information;

instructions for transmitting the authorization transactions and the access transactions from a user device to a remote host processing device;

instructions for analyzing the authorization transactions and the access transactions on the host processing device to match a specific authorization transaction with a specific access transaction based on said timestamp information and duration information; and instructions for creating a billing record on the host processing device based on the matched authorization transactions and access transactions.

20. The memory devices according to claim 19 further comprising instructions for detecting indicia of fraud based on the results of the step of analyzing authorization transactions and access transactions.

21. The memory devices according to claim 20, wherein said indicia includes numerous access transactions during a predetermined short time duration on said user device or simultaneous access for the same service on multiple said user devices.

22. The memory devices according to claim 19 further comprising instructions for updating a database based on the results of the step of analyzing authorization transactions and access transactions.

23. The memory devices according to claim 19 further comprising instructions for periodically transmitting transactions.

24. The memory devices according to claim 19 further comprising instructions for securing said records of authorization transactions and access transactions.

25. The memory devices according to claim 24, wherein said instructions for securing is performed prior to and during the step of transmitting said records of authorization transactions and access transactions.

26. The memory devices according to claim 19 further comprising instructions for providing multiple access transactions to a service over a prescribed time interval under a single authorization transaction.

27. The memory devices according to claim 26 further comprising instructions for creating a single billing event for said multiple access transactions.

28. The memory devices according to claim 19, wherein said instructions for access transactions may occur anytime during the time span of said authorization transaction.

29. The memory devices according to claim 19, wherein said instructions for wherein said instruction of analyzing and creating are performed for a plurality of said user devices.

30. The memory devices according to claim 19, wherein said instructions for transmitting records comprises transmitting said records in any chronological order.

* * * * *